United States Patent [19]

Ikeuchi

[11] Patent Number: 5,388,191
[45] Date of Patent: Feb. 7, 1995

[54] METHOD AND APPARATUS FOR DISPLAYING A TWO-DIMENSIONAL TONE PICTURE

[75] Inventor: Hideki Ikeuchi, Tokyo, Japan
[73] Assignee: NEC Corporation, Tokyo, Japan
[21] Appl. No.: 886,523
[22] Filed: May 20, 1992
[30] Foreign Application Priority Data
  May 21, 1991 [JP] Japan .................... 3-115161
[51] Int. Cl.6 ............................. G06F 15/20
[52] U.S. Cl. .................................. 395/131
[58] Field of Search ............ 395/133, 155, 161, 131, 395/141; 340/747, 750; 358/75, 80; 345/153, 154, 155

[56] References Cited
U.S. PATENT DOCUMENTS

| | | | |
|---|---|---|---|
| 5,024,969 | 4/1993 | Capps et al. | 395/800 |
| 5,081,592 | 1/1992 | Jenq | 364/487 |
| 5,211,564 | 5/1993 | Martinez et al. | 434/323 |

*Primary Examiner*—Phu K. Nguyen
*Attorney, Agent, or Firm*—Whitham, Curtis, Whitham & McGinn

[57] ABSTRACT

A method and an apparatus for displaying a two-dementional tone picture of analysis data by use of the Finite-Element-Method include, in one element, determining lines for a display region on the basis of one tone boundary value of the analysis data and painting the display region with a predetermined color according to the tone boundary value. The operations of determining the boundary lines and painting are repeatedly executed in turn through all of the tone boundary values so as to complete the display of a two-dimensional tone picture in one element. Thereafter, this execution of one element is repeated through all of the finite elements so as to complete the display of a two-dimensional tone picture of an entire display region. As a result, a correct display is obtained on the basis of all optional tone boundary values as well as all optional data values with a convenient visual comprehension of optional analysis data.

22 Claims, 7 Drawing Sheets

FIG.1

PRIOR ART

DISPLAY REGION

FIG.2A

PRIOR ART

FIG. 2B PRIOR ART

| ADJACENT ELEMENT TO ELEMENT A | | |
|---|---|---|
| | CONFIG. OF LINE | ADJ. ELEMENT |
| LINE I | ①–② | ELEMENT B |
| LINE II | ②–③ | ELEMENT E |
| LINE III | ③–④ | ELEMENT D |
| LINE IV | ④–① | ELEMENT C |

— (BOUNDARY VALUE) = 3
  OF TONE

FIG. 5 PRIOR ART

— (BOUNDARY VALUE) = 3
  OF TONE

METHOD AND APPARATUS FOR DISPLAYING A TWO-DIMENSIONAL TONE PICTURE

BACKGROUND OF THE INVENTION

The present invention relates to a method and an apparatus for graphically displaying analysis data by use of the Finite-Element-Method (FEM) and more particularly to a method and an apparatus for displaying a two-dimensional tone picture.

Figure 1:
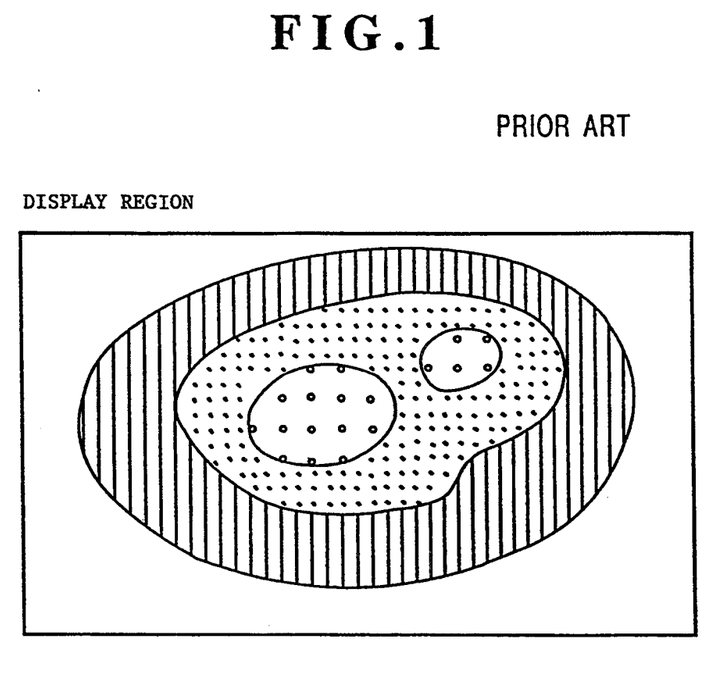
FIG. 1 is a pictorial view showing a two-dimensional tone picture of the display region in the prior art.

In the conventional method and apparatus for displaying a two-dimensional tone picture of the analysis data by use of the Finite-Element-Method as shown in FIG. 1, each display region according to a boundary value of the analysis data is found in an entire display region before each of the display regions is painted with a predetermined color so as to display a two-dimensional tone picture.

Figure 2A:
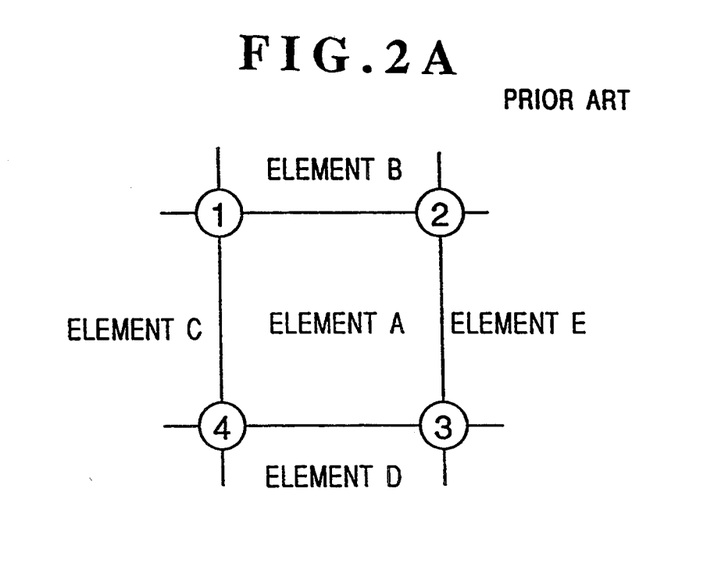
FIGS. 2A is a pictorial view showing a relation of the adjacent elements in the prior art.
Figure 2B:
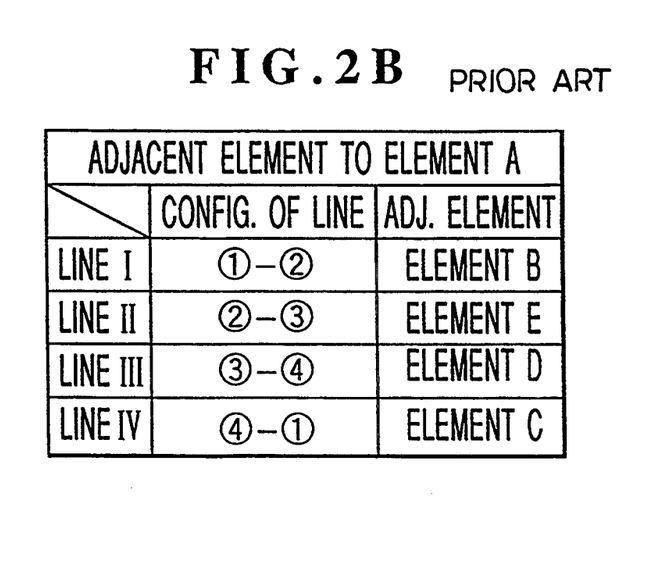
FIGS. 2B is a table showing a relation of the adjacent elements in the prior art.
Figure 3:
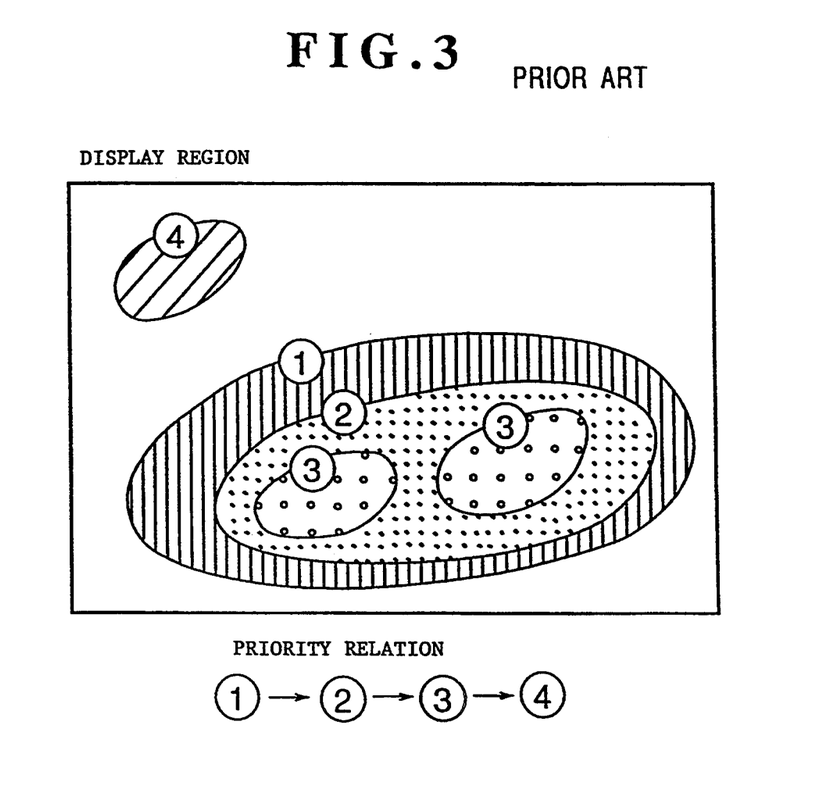
FIG. 3 is a pictorial view showing a priority relation of a painting operation of a two-dimensional tone picture in the prior art.

In FIGS. 2A and 2B, an information of adjacent relations of each line segment of the element constructed by nodal points and other elements is set as a flag and an existence of points which accord with a tone boundary value on each line segment of one element is found. When the points exist, the above steps are repeatedly executed in an element adjacent to the line segment including the point so as to obtain a sequence of points. When the sequence of points reaches an end of an entire display region or an element which was judged, the sequence of points is closed to be made into a display region. The set forth steps are executed through all of the elements on the constant boundary value before the above steps are executed through all of the tone boundary values to determine each display regions so as to complete a determination of all display regions. When one display region includes the other display regions, a painting operation is executed in a display region including the other display regions prior to the other display regions so as to complete displaying a two-dimensional tone picture.

Figure 4:
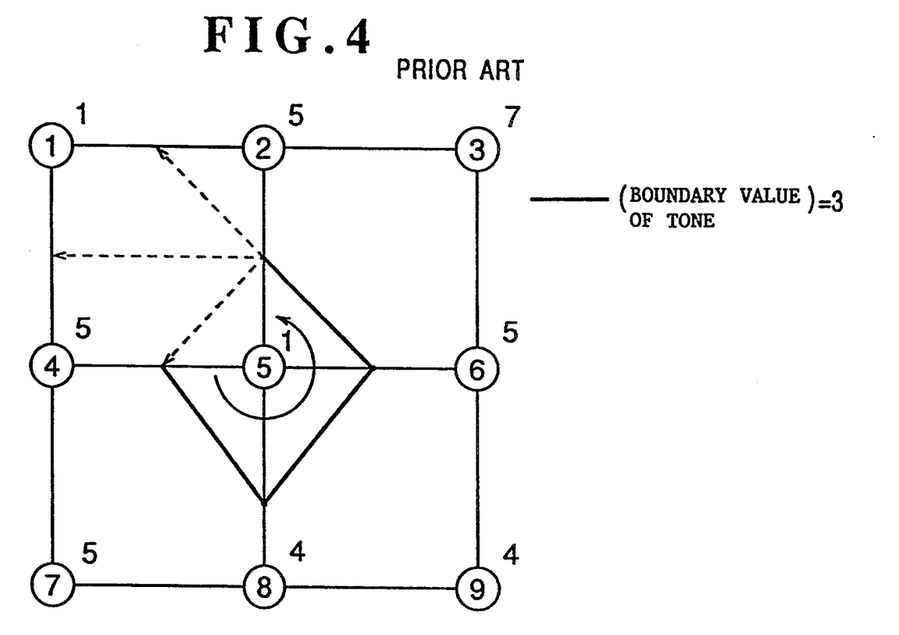
FIG. 4 is a pictorial view showing a problem in an operation for a two-dimensional tone picture display in the prior art.

However, as shown in FIG. 4, when on line segments of one element adjacent to the line segment including a base point having a value of analysis data equal to a tone boundary value there are two or more found points whose value is equal to the tone boundary value except the base point, two or more tone boundary lines to be connected to the base point with the above two or more found points cause an infinite factor so that determination of a correct display region is impossible.

Figure 5:
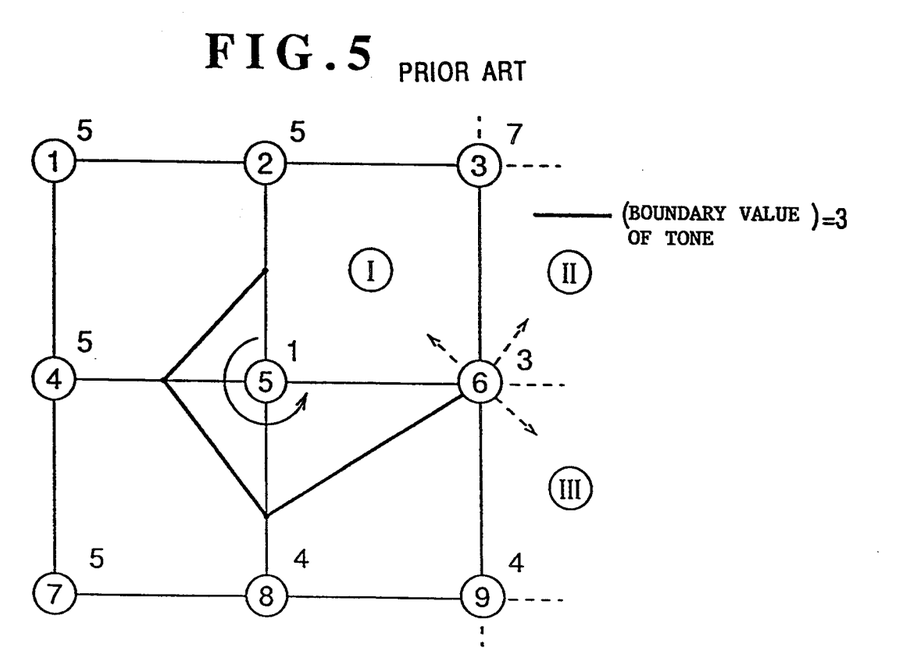
FIG. 5 is a pictorial view showing another problem in an operation for a two-dimensional tone picture display in the prior art.
Figure 6:
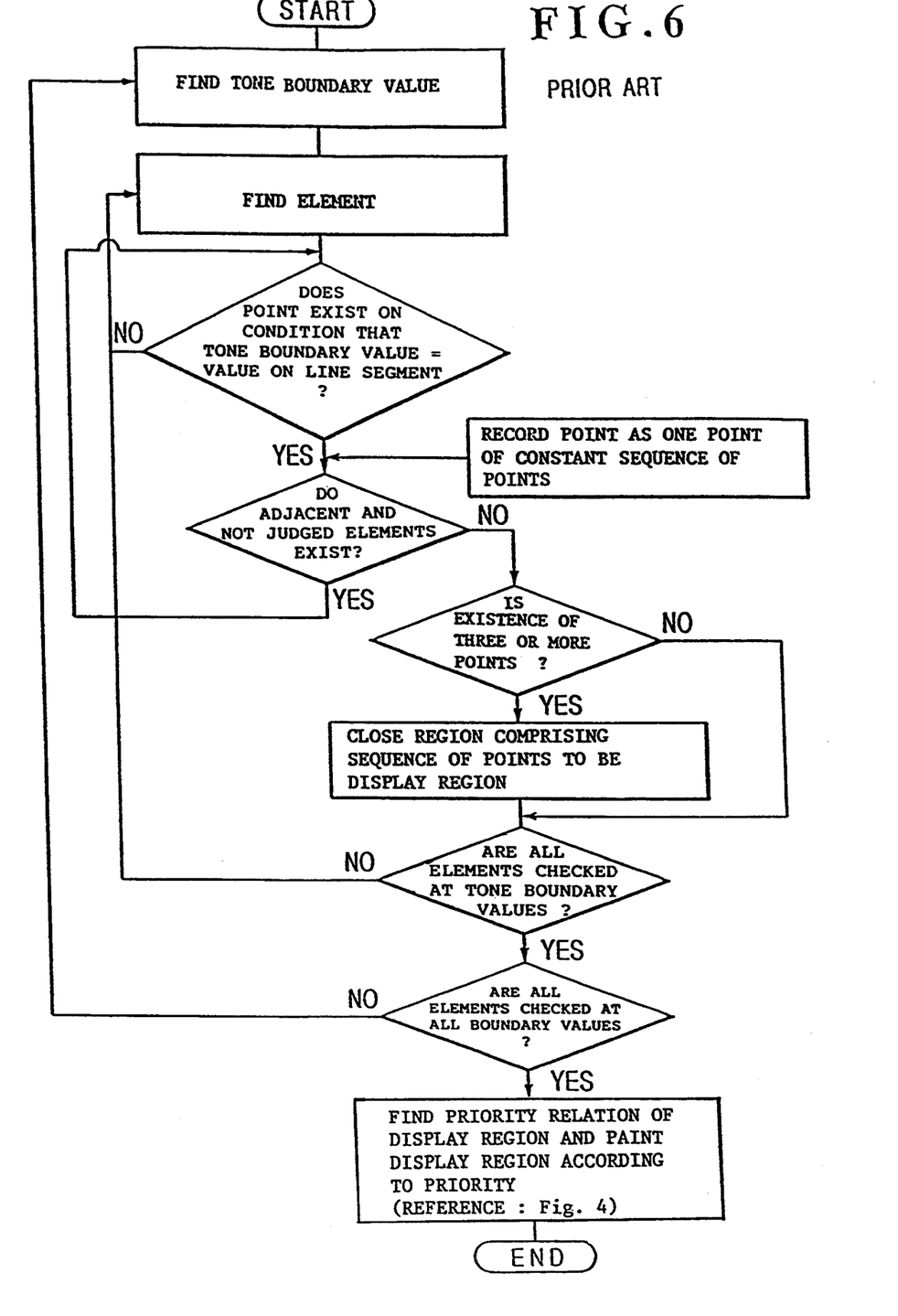
FIG. 6 is a flow chart of a sequence of operations for a two-dimensional tone picture display in the prior art.
Figure 7:
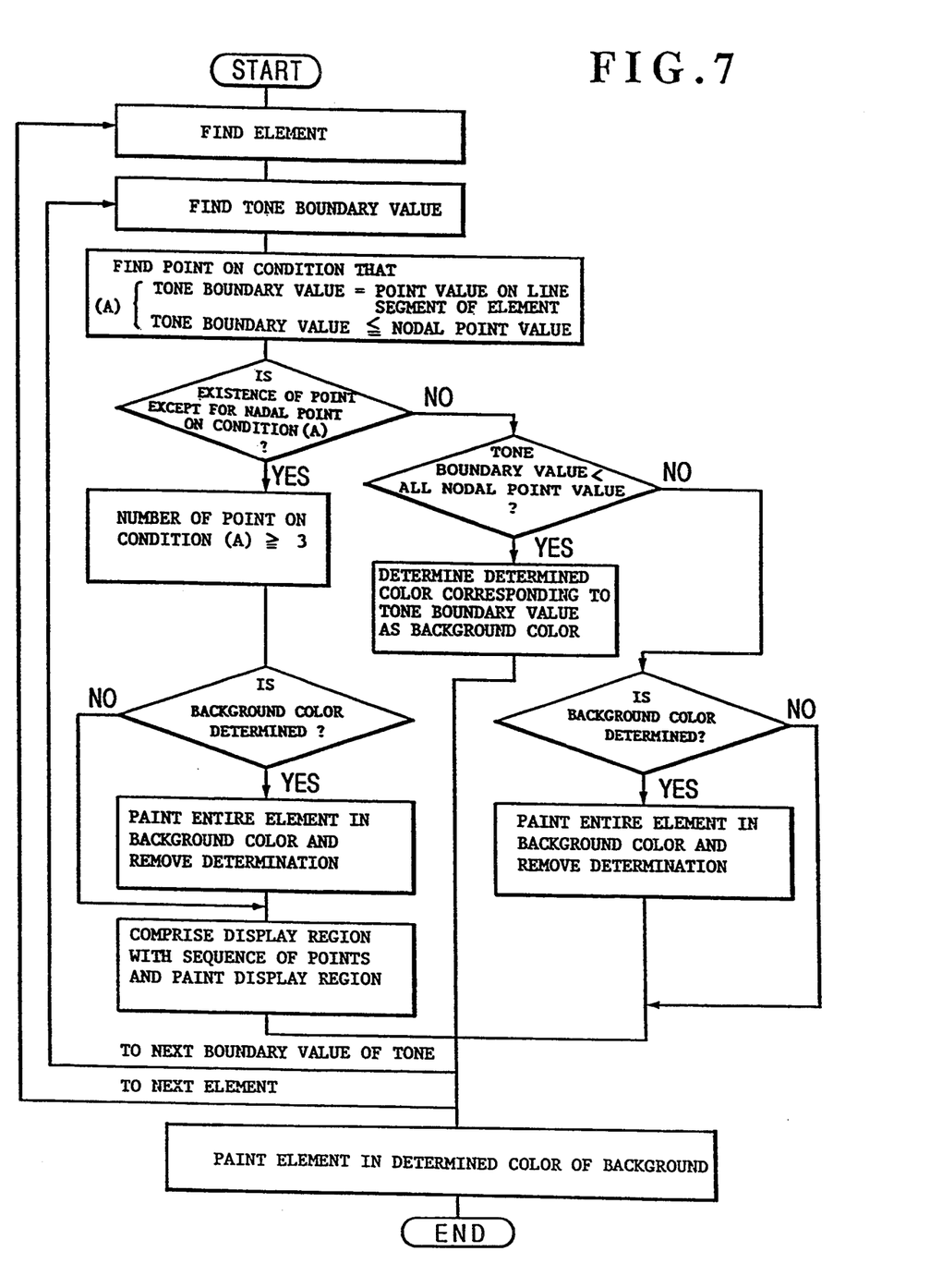
FIG. 7 is a flow chart of a sequence of operations for a two-dimensional tone picture display method according to the invention.
Figure 8:
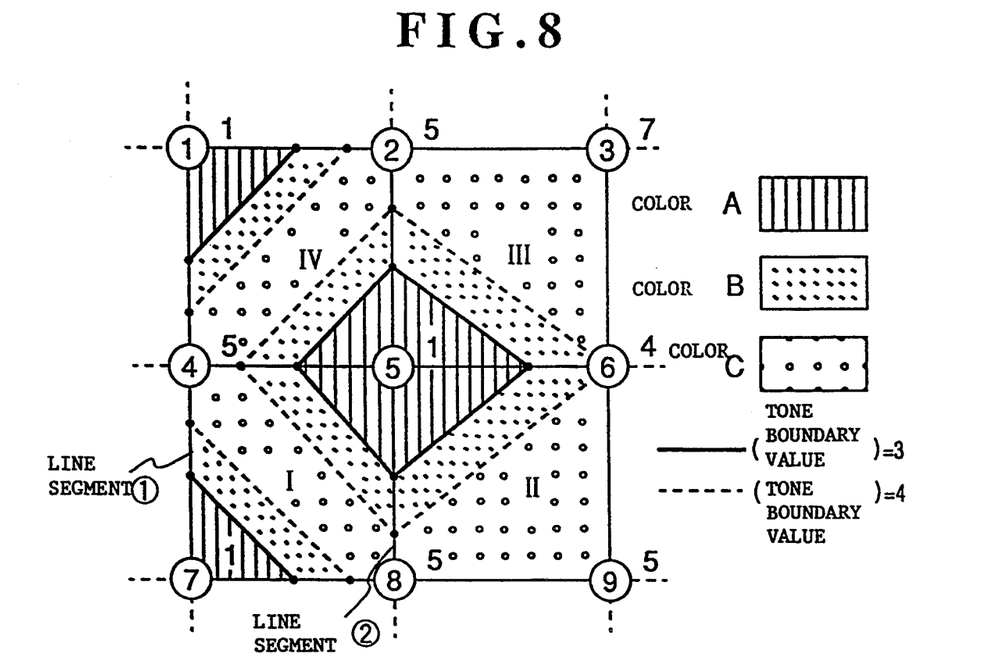
FIG. 8 is a pictorial view showing a display of a two-dimensional tone picture according to the invention.

Otherwise, as shown in FIG. 5, when a nodal point of the element has a tone boundary value, there are a plurality of adjacent elements to the nodal point which cause an infinite factor so that the correct determination of the display region surrounded by the tone boundary lines is also impossible.

Consequently, the prior art has the problems that, when there are large variation in analysis data or available determination of a optional tone boundary value is required, an execution of a correct display of a two dimensional tone picture is impossible.

SUMMARY OF THE INVENTION

Objects of the present inventions are to provide a method and an apparatus for displaying a two-dimensional tone picture of analysis data by use of the Finite-Element-Method, in which execution of the correct display of a two-dimensional tone picture may be performed on the basis of optional tone boundary values or every data.

In order to solve the above problems, in a method and an apparatus for displaying a two-dimensional tone picture of analysis data according to the present invention, and operation of finding points with a value of analysis data equal to a boundary value of analysis data on each line segment of an element constructed by nodal points is executed. A value of each of the nodal points of the element is compared with the boundary value of analysis data. A display region composed of boundary lines constructed by a set of the found points on the line segments and the compared nodal points of the element is determined. A painting operation of the determined display region with a predetermined color according to the tone boundary value is executed. The above executions from the finding operation to the painting operation are repeated in turn on the basis of all predetermined tone boundary values so as to complete the display of a two-dimensional tone picture of one element, and the above executions from the finding operation to the repeating operation are repeated in turn through all of finite elements so as to complete the display of the two-dimensional tone picture of all the elements.

When there are points having a value of analysis data equal to the tone boundary value on a plurality of line segments, the display region is painted with a predetermined color according to the tone boundary value.

When a background color of the element is determined, the display region is painted with a predetermined color according to the tone boundary value after painting the predetermined background color on an entirely of the one element.

BRIEF DESCRIPTION OF THE DRAWINGS

Preferred embodiments of the present inventions will hereinafter fully be described in detail with reference to the accompanying drawings.

PREFERRED EMBODIMENTS OF THE INVENTION

In a method and an apparatus for displaying a two-dimensional tone picture of analysis data according to the present invention, an operation of finding points with a value of analysis data equal to a boundary value of analysis data on each line segment of an element constructed by nodal points is executed. A value of each of the nodal points of the element is compared with the boundary value of analysis data. A display region composed of boundary lines constructed by a set of the found points on the line segments and the compared nodal points of the element is determined. A painting operation of the determined display region with a predetermined color according to the tone boundary value is executed. The above executions from the finding operation to the painting operation are repeated in turn on the basis of all predetermined tone boundary values so as to complete the display of a two-dimensional tone picture of one element, and the above executions from the finding operation to the repeating operation are repeated in turn through all of the finite elements so as to complete the display of the two-dimensional tone picture of all the elements.

When the above executions from the finding operation to the painting operation are repeated in the sequence of smallest to largest on the basis of all predetermined tone boundary values, values of analysis data of the nodal points of one element are compared with the tone boundary value and a value larger than the tone boundary value is available for determining boundary lines.

Otherwise, when the above executions from the finding operation to the painting operation are repeated in the sequence of largest to smallest on the basis of all predetermined tone boundary values, values of analysis data of the nodal points of one element are compared with the tone boundary value and a value smaller than the tone boundary value is available for determining boundary lines.

When there are points having a value of analysis data equal to the tone boundary value on a plurality of line segments, the display region is painted with a predetermined color according to the tone boundary value.

When a background color of the element is determined, the entirely of the element is painted with the predetermined background color before the determined display region is painted with a predetermined color according to the tone boundary value.

The element may be defined to not only be a square as shown in the figures but also a triangle.

Therefore, according to the present invention, a two-dimensional tone display of one element is completely executed by means of determining boundary lines on the basis of all tone boundary values of the analysis data and painting a predetermined color according to the tone boundary value on the display region so as to complete the display of a two-dimensional tone picture in one element. And then, this complete execution of one element is repeated through all of the finite elements so as to complete the display of a two-dimensional tone picture of an entire display region.

Optionally, boundary lines are determined on the basis of one tone boundary value of the analysis data and the display region is painted with a predetermined color according to the tone boundary value. Thereafter, the determining operation of the boundary lines and the painting operation are repeatedly executed in turn through all of the tone boundary values.

The above determining operation of the boundary value and painting operation on the basis of a plurality of boundary values of analysis data will hereinafter fully be described in detail with reference to FIG. 7 to FIG. 10.

Figure 9:
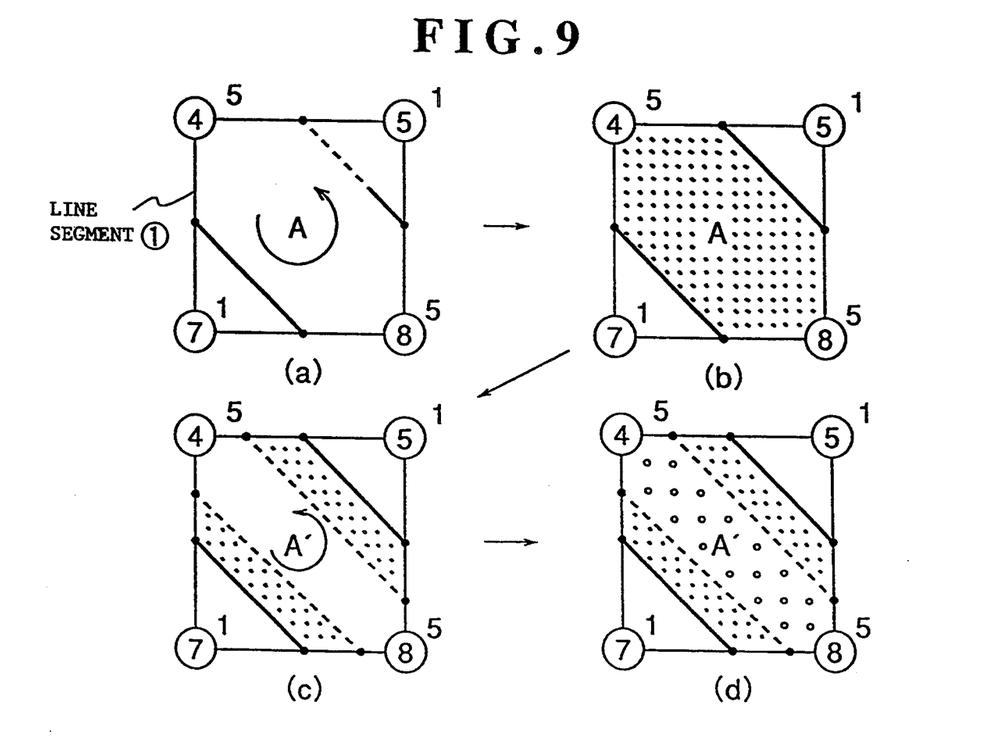
FIG. 9 is a pictorial view of one example of a two-dimensional tone picture display according to the invention.

Referring to FIG. 9, points having values of analysis data equal to the predetermined tone boundary value are found on line segments of one element and values of analysis data at nodal points of one element are compared with the tone boundary values. Four line segments of the element include four points having a value of analysis data equal to the tone boundary value and two nodal points have values of analysis data larger than the tone boundary value. The region surrounded by boundary lines constructed by the four points on the line segments and two nodal points is obtained and serves as a display region. When a background color of an element is required, the entirety of the element is painted with the predetermined background color and determination of the background color of the element is released before the defined display region is painted with a determined color. Thereafter, on the basis of all tone boundary values of analysis data, the above operations are repeatedly executed to complete the display of a two-dimensional tone picture.

Consequently, when there are three or more points having values of analysis data equal to the tone boundary value, that is, two or more tone boundary lines corresponding to the same value in one element, a correct display of two-dimensional tone picture may conveniently be obtained.

Figure 10:
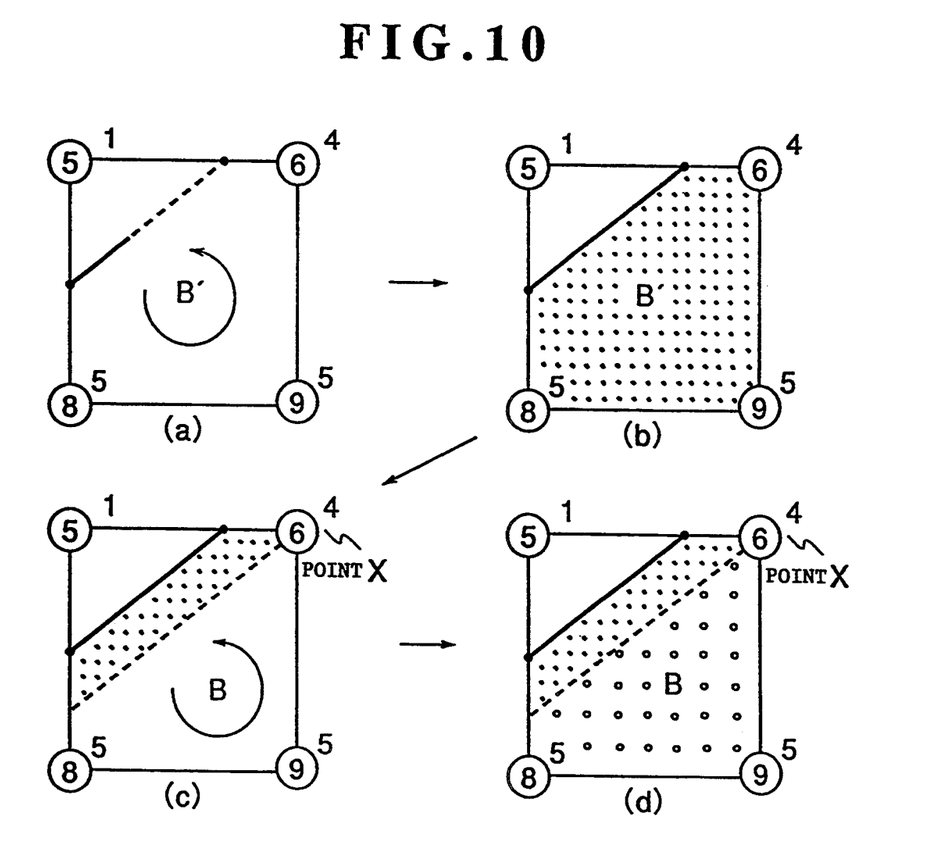
FIG. 10 is a pictorial view of another example of a two-dimensional tone picture display according to the invention.

Otherwise, referring to FIG. 10, points having values of analysis data equal to the predetermined tone boundary value are also found on line segments of one element and values of analysis data at nodal points of one element are also compared with the tone boundary values. But, in this case, four line segments of the element include two points having a value of analysis data equal to the tone boundary value in which one point of the two serves as a nodal point of the element. Three nodal points have values of analysis data larger than the tone boundary value. The region surrounded by boundary lines constructed by the point on the line segments and three nodal points is obtained and serves as a display region. When a background color of analysis data is required, the entirely of the element is also painted with the predetermined background color and determination of the background color of the element is also released before the defined display region is painted with a determined color. Thereafter, on the basis of all tone boundary value of analysis data, the above operations are repeatedly executed to complete the display of a two-dimensional tone picture.

Consequently, when a nodal point of the element serves as a point having a value of analysis data equal to the tone boundary value, namely tone boundary lines corresponding to the one value of analysis data is closed at a nodal point of the element, a correct display of two-dimensional tone picture may conveniently be obtained.

As hereinbefore described, a method and an apparatus for displaying a two-dimensional tone picture of analysis data by use of the Finite-Element-Method according to the present invention are capable of obtaining a correct display on the basis of all optional tone boundary values as well as all optional data values and further are effective as a visual comprehension of optional analysis data.

Whereas many alternations or modifications according to the present invention will become conveniently understood to persons of ordinary skill in the art after having understood the foregoing descriptions, it is to be understood that the particular embodiments described and shown by way of illustration are in no way intended to be considered limiting.

What is claimed is:

1. A method of displaying a two-dimensional tone picture comprising the steps of:
   finding points with a value of analysis data equal to a boundary value of a tone on each line segment of an element constructed by nodal points,
   comparing a value of each of the nodal points of the element with the tone boundary value of said analysis data,
   determining a display region composed of boundary lines constructed by a set of the points found on the line segments and the compared nodal points of the element,
   painting the display region with a predetermined color according to the tone boundary value,
   repeating in turn said steps of finding, comparing, determining and painting for all of said predetermined tone boundary values so as to complete the display of the two dimensional tone picture of said element, and
   repeating in turn the said steps of finding, comparing, determining, painting and repeating, through all of a plurality of finite elements so as to complete the display of the two-dimensional tone picture of all of the plurality of finite elements.

2. A method of displaying a two-dimensional tone picture as claimed in claim 1, wherein said step of repeating said steps of finding, comparing, determining and painting is executed in a sequence of smallest to largest for all predetermined tone boundary values.

3. A method of displaying a two-dimensional tone picture as claimed in claim 2, wherein the compared nodal points in said determining step have larger values than the tone boundary value.

4. A method of displaying a two-dimensional tone picture as claimed in claim 1, wherein said step of repeating said steps of finding, comparing, determining and painting is executed in a sequence of largest to smallest for all predetermined tone boundary values.

5. A method of displaying a two-dimensional tone picture as claimed in claim 4, wherein the compared nodal points in said determining step have smaller values than the tone boundary value.

6. A method of displaying a two-dimensional tone picture as claimed in claim 1, wherein said painting step includes the step of painting, when there are points having a value of analysis equal to the tone boundary value on a plurality of line segments, a predetermined color according to the tone boundary value on the display region.

7. A method of displaying a two-dimensional tone picture as claimed in claim 1, wherein said step of painting includes the step of painting, when a background color of the element is determined, the display region with a predetermined color according to the tone boundary value after painting the entirety of the element with the predetermined background color.

8. A method of displaying a two-dimensional tone picture as claimed in claim 1, wherein the element includes a square.

9. A method of displaying a two-dimensional tone picture as claimed in claim 1, wherein the element includes a triangle.

10. A method of displaying a two-dimensional tone picture comprising the steps of:
    executing completely a two-dimensional tone display of an element by determining boundary lines for all tone boundary values of the analysis data and painting the display region with a predetermined color according to the tone boundary values, and
    repeating said step of executing through all of a plurality of finite elements so as to complete the display of a two-dimensional tone picture of an entire display region,
    said step of executing including a step of finding points with a value of analysis data equal to a boundary value of a tone on each line segment of an element constructed by nodal points, and a step of comparing a value of each of the nodal points of the element with the tone boundary value of the analysis data.

11. A method of displaying a two-dimensional tone picture as claimed in claim 10, wherein said step of executing includes the steps of determining boundary lines for one tone boundary value of the analysis data, painting the display region with a predetermined color according to the tone boundary value, and repeating in turn said steps of determining and painting for all of the tone boundary values.

12. An apparatus for displaying a two-dimensional tone picture comprising:
    means for finding points with a value of analysis data equal to a tone boundary value on each line segment of an element constructed by nodal points of the element,
    means for comparing a value of analysis data of each of the nodal points of the element with the tone boundary value of the analysis data,
    means for determining a display region composed of boundary lines constructed by a set of the points found on the line segments and the compared nodal points of the element,
    means for painting the display region with a predetermined color according to the tone boundary value,
    first repeating means for repeating in turn executions of said finding means, said comparing means, said determining means and said painting means, for all predetermined tone boundary values so as to complete the display of the two-dimensional tone picture of one element, and
    second repeating means for repeating in turn executions of said finding means, said comparing means, said determining means, said painting means and said first repeating means, through all of a plurality of finite elements so as to complete display of a two dimensional tone picture of all of the plurality of finite elements.

13. An apparatus for displaying a two-dimensional tone picture as claimed in claim 12, wherein said second repeating means includes means for repeating executions in a sequence of smallest to largest for all predetermined tone boundary values.

14. An apparatus for displaying a two-dimensional tone picture as claimed in claim 13, wherein the compared nodal points in said determining means have larger values than the tone boundary value.

15. An apparatus for displaying a two-dimensional tone picture as claimed in claim 12, wherein said second repeating means includes means for repeating the executions in a sequence of largest to smallest for all predetermined tone boundary values.

16. An apparatus for displaying a two-dimensional tone picture as claimed in claim 15, wherein the compared nodal points in said determining means have smaller values than the tone boundary value.

17. An apparatus for displaying a two-dimensional tone picture as claimed in claim 12, wherein said painting means includes means for painting, when there are points having a value of analysis data equal to the tone boundary value on a plurality of the line segments, the display region with a predetermined color according to the tone boundary value.

18. An apparatus for displaying a two-dimensional tone picture as claimed in claim 12, wherein said painting means includes means for painting, when a background color of the element is determined, the display region with a predetermined color according to the tone boundary value after painting the entirety of the element with the predetermined background color.

19. An apparatus for displaying a two-dimensional tone picture as claimed in claim 12, wherein the element includes a square.

20. An apparatus for displaying a two-dimensional tone picture as claimed in claim 12, wherein the element includes a triangle.

21. An apparatus for displaying a two-dimensional tone picture comprising:

means for executing completely the display of a two-dimensional tone picture of a first element of a plurality of finite elements by determining boundary lines for all tone boundary values of the analysis data and by painting a display region with a predetermined color according to the tone boundary values, and means for repeating said execution through all elements of the plurality of finite elements so as to complete the display of a two-dimensional tone picture of an entire display region, said means for executing including means for finding points with a value of analysis data equal to a tone boundary value on each line segment of an element constructed by nodal points, and means for comparing a value of analysis data of each of the nodal points of the element with the tone boundary value of the analysis data.

22. An apparatus for displaying a two-dimensional tone picture as claimed in claim 21, wherein said executing means includes means for determining boundary lines for one tone boundary value of the analysis data, means for painting the display region with a predetermined color according to the tone boundary value, and means for repeating in turn said determining of boundary lines and said painting of the display region for all of the tone boundary values.

* * * * *